UNITED STATES PATENT OFFICE.

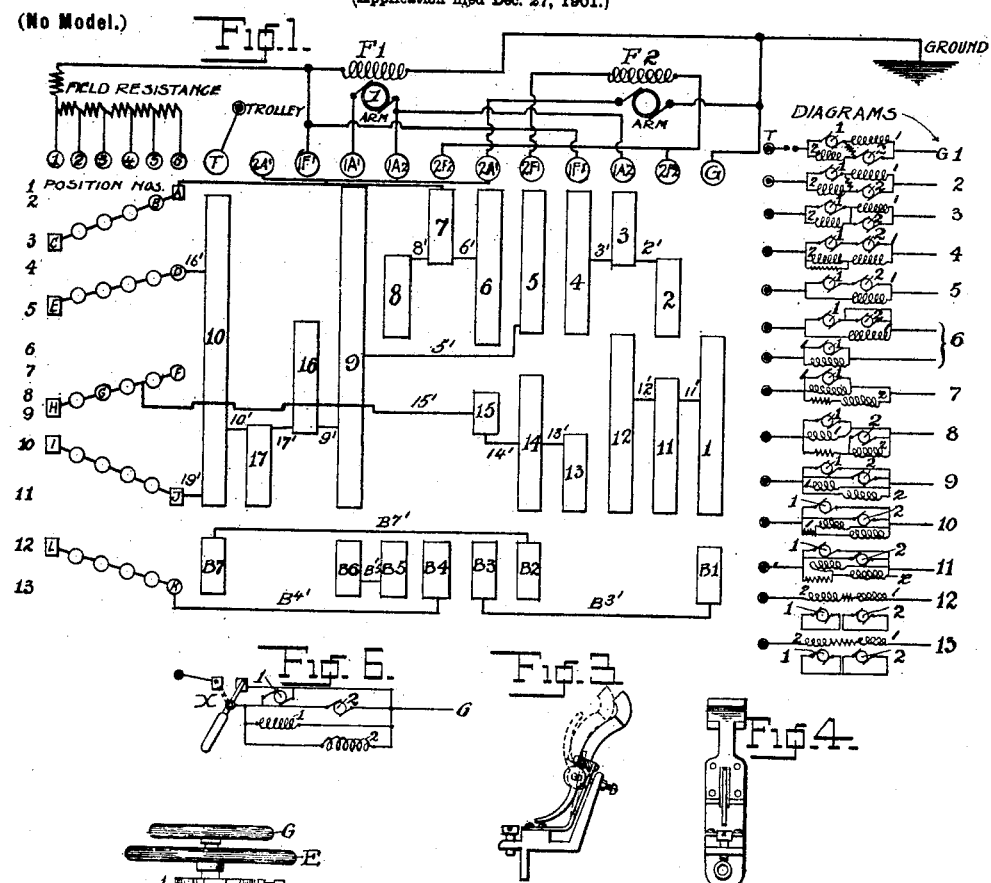

SUSIE A. HENRY, OF DENVER, COLORADO, EXECUTRIX OF JOHN C. HENRY, DECEASED, ASSIGNOR TO STANLEY ELECTRIC MANUFACTURING COMPANY, A CORPORATION OF NEW JERSEY.

ELECTRIC VEHICLE.

SPECIFICATION forming part of Letters Patent No. 708,962, dated September 9, 1902.

Original application filed June 3, 1899, Serial No. 719,264. Divided and this application filed December 27, 1901. Serial No. 87,425. (No model.)

*To all whom it may concern:*

Be it known that JOHN C. HENRY, now deceased, but during his lifetime a citizen of the United States, and a resident of Denver, in the county of Arapahoe, State of Colorado, did invent certain new and useful Improvements in Electric Vehicles, of which the following is a specification.

This application is a division of application Serial No. 719,264, filed June 3, 1899, by John C. Henry, the present case relating to the apparatus described in such original application, said original application having been restricted to a certain method of controlling electric motors.

The invention relates to improvements in electric vehicles, and although many of its features are applicable to electric cars it will be described as applied to an electric vehicle of the automobile type.

The invention more particularly relates to the control of a pair of dynamo-electric machines operating an electric vehicle. The machines in this case are used for several purposes—viz., propelling the vehicle, retarding or braking the same, regenerating electricity to its original source, and also for steering the vehicle. In other words, the motors are employed to operate and stop a vehicle to regenerate to the battery in the form of electricity the energy ordinarily destroyed by the application of frictional brakes where they are used to overcome the force of momentum or gravity.

Means are also shown whereby the motors may be employed to recharge the battery in an economical way by having them driven mechanically when acting as generators.

In the drawings, Figure 1 represents diagrammatically a development of the preferred form of controller, together with diagrams showing the various courses of the current through the motors and also showing connections with the source of energy, motors, &c. Fig. 2 shows the controller in elevation. Fig. 3 is a side view of a special form of contact-maker. Fig. 4 is a face view of the same. Fig. 5 shows diagrammatically the connections of the source of energy—*i. e.*, the battery, with the motors and controllers and an overload alarm. Fig. 6 shows in diagram the same combination as shown in diagram 9, Fig. 1; but in this case a special form of trolley-switch is also used therewith, whereby the motors may be short-circuited free from the line.

In Fig. 1 ARM 1 and ARM 2 represent the armatures of a pair of motors, while F' and F² represent the fields of the motors. "Trolley" represents the source of energy, whether from a railway circuit or battery, while "Ground" represents the other side of the circuit. The diagrams on the right-hand side of the development show the course of current when the contact-fingers are in line with the corresponding numbered positions on the left-hand side of the development. Diagram 1, which corresponds with position No. 1, Fig. 1, shows armature No. 1 in series with its own field and field No. 2 in series with its own armature, while a cross connection of high resistance is shown between the two motors. In this combination it will be noticed the motors are disconnected from the source of energy, it being preparatory to the combination shown in diagram No. 2—*i. e.*, the combinations are effected before the trolley is connected to them. In position 2, diagram 2, it will be noticed that the motors are simply series machines placed in parallel with the line, this being the starting position, and where the circuit is finally broken when stopping it is particularly desirable that the motors have great torque. At the same time the amount of current they are dealing with is very small, being limited by the high resistance of the field-magnets which are ordinarily employed in shunt. The resistance forming the cross connection between the two motors is used for a double purpose. First, it offers a path for the "back kick" (which appears on breaking the magnetic circuit) from the low-resistance armature instead of compelling it to dissipate where the resistance is very high. As the force of this kick is proportional to the resistance which it has to contend with it is highly important in order to prevent puncturing the insulation that it is furnished with a lower resistance path or circuit. Secondly, this cross connection serves to tie the motors together, so that slipping of one and throwing of an undue proportion of the load on the other is avoided. By leaving the motors cross connected, as shown—i. e., the field of No. 2 in shunt with armature No. 1 and the field of No. 1 in shunt with armature No. 2—the controller produces a desirable result and overcomes a defect well understood in the operation of motors for traction purposes. In the ordinary series arrangement—on railway-cars, for instance—the slipping of the wheels on one motor increases that motor's speed and its voltage, and consequently robs the other motor of its voltage and force. While both motors are compelled to take the same amount of current, the slippage of one pair of wheels increases the voltage of its motor nearly equal to that of the line, so that the second motor has no force and its wheels stand idle. By the arrangement shown the slipping of one motor increases the force of the other, so that the traction-wheels are tied, as it were, together. Bearing in mind this explanation it will be seen how we are able in the following position—that is, in No. 4—to remove one motor from the circuit without sparking or flashing at the contacts or other abnormal effects. The field resistance gradually short-circuits the field of the motor No. 2, (see diagram 4,) so that the corresponding armature revolves without cutting lines of force. Its electromotive force and resistance are reduced to almost nothing. Then the armature is short-circuited, as shown in position 6, diagram 6, the field being previously short-circuited and removed by the resistance. This leaves but one motor in the circuit—i. e., No. 1 armature and its own field, as shown in diagram 6. In position 7 we prepare to put motor No. 2 in parallel with No. 1. We first put the field in series with the resistance across the main. (See diagram 7.) The next step, position 8, diagram 8, we connect the armature in shunt with its own field. In this position the armature being driven by the movement of the car generates a current counter to that from the line and meets and opposes that coming from the line through the resistance, so that the current from the line and that from motor No. 2 are in opposition, and consequently neutralize each other. Consequently armature No. 2 may be connected or disconnected from the circuit without flashing, and interruption of the circuit is avoided. In diagram 9 the motors are shown in parallel. In diagrams 10 and 11 they are also shown in parallel, with resistance in their field-circuits which regulates their speed. Diagrams 12 and 13 show means of applying the brake after the back electromotive force of the motor (owing to the slowing down of the speed) has decreased so far that it can offer no available resistance against that from the line.

In Fig. 6 means are shown whereby the supplementary or trolley switch may be used to short-circuit the motors in parallel to give a maximum braking effect.

In retracing this description it will be observed that starting with position 11, diagram 11, and moving backward we gradually increase the electromotive force of the motors, so that they regenerate current to the line or battery. The force of momentum or that of gravity is thus returned to its original source instead of being wasted by friction when slowing down, checking, or braking the vehicle.

It will be observed in position 2, diagram 2, that the amount of current absorbed by the motors is very small owing to the higher resistance commonly used in shunt-wound-motor fields, so that when the circuit is broken the flash is correspondingly small. At the same time there can be no flash occasioned by the self-induction from the fields when the circuit is broken, as is usually the case in the ordinary series motors.

In position 1, diagram 1, there are two series motors in parallel with a tie including all the resistance from the leaving side of second field to entering side of first field, all connections being made excepting the open circuit at the top of contact No. 10.

In position 2, diagram 2, the connections are the same as the above, except the circuit is closed on the trolley by contact No. 10. The path of the current is then as follows: Current enters contact 10 by trolley-finger and branches, one half going to contact 9 via connections 10′ 17′ 9′ and via contacts 17 and 16, through armature 1 out finger 1 $A^2$ to contact 3, thence to contact 4 via connections 3′, thence out finger 1 F′ through No. 1 field to the ground. The other half leaves contact 10, going to contact 5 via connections 10′, 17′, 9′, and 5′, (and contacts 17, 16, and 9,) thence out finger 2 F′ through the second field, thence to contact No. 7 via finger 2 $F^2$, thence to contact 6 via connection 6′, thence to armature 2 via finger 2 A′, and then to the ground. The tie of resistance starts from contact 7, goes through connection 7′, out resistance-contact B, through 5 resistance divisions via resistance-fingers 5 to the entering side of field I. This tie extends across from the leaving side of the second F to entering side of first F.

In position 3, diagram 3, the path of the current in this position is electrically the same as in position 2, with the exception that the resistance has been decreased until its place has been taken by a conductor having no resistance, which starts at contact 8 and goes to contact 6 via connection 8′, contact 7, and connection 6′, thus connecting the leaving side of A′ to the entering side $A^2$. The path of the current is then through the two motors in series.

In position 4, diagram 4, the current on this position enters trolley-contact 10 via trolley-finger, divides, part going to contact 9 via connections 10′, 17′, and 9′, thence to A′ via finger 1 A′ and leaves via finger 1 $A^2$, going to contact 8, thence to contact 6 via connections 8' and 6', thence to second armature and ground via finger 2 A'. The other part leaves contact 10, goes to contact 5 via connections 10', 17', 9', and 5', thence to $F^2$ via finger 2 F', and then to contact 2 via finger 2 $F^2$, thence to contact 4 via connections 2' and 3', thence through F' to the ground via finger 1 F'. The resistance (at this position is high) going around $F^2$ starts at contact 10, thence through all the resistance via connection 16' and resistance-contact D and resistance-finger 6 to the leaving side of the second F via finger 1 F', contacts 4 and 3, and connections 3' and 2'.

In position 5, diagram 5, the only difference in this position from the one above is that the first field is now supplied with current direct from the trolley, as the resistance placed around $F^2$ has been decreased to 0. The current then reaches F' direct from the trolley in the following manner: In leaving the trolley-contact 10 the current goes to contact 16 via connections 10' and 17', thence to first field via finger 1 F'.

Position 6, diagram 6: Armature 2 has been short-circuited, thus leaving only one motor doing work. The path of the current is as follows: The current divides at contact 10, part going to contact 9 via connections 10', 17', and 9', thence to A' via finger 1 A', thence to the ground via finger 1 $A^2$, contact 12, and connections 12' and 11' to contact 1 and G finger. The other part leaving contact 10 goes to contact 16 via connections 10' and 17', thence to F' and ground via finger 1 F'.

Position 7, diagram 7: The path through the A and F of motor 1 is the same as previous position. Current also flows from the trolley through the resistance and $F^2$ to the ground. Its path is as follows: The current leaving contact 10 goes to contact 16 via connections 10' and 17', thence through the resistance to contact 14 via finger 1 F', thence to resistance-finger 6, thence to resistance contact F, thence through connections 15' and 14'. From contact 14 it goes to field 2, and the ground G via finger 2 F' and out by finger 2 $F^2$ to contact 11, thence to ground contact 1 via connection 11' and out G finger to ground.

In position 8, diagram 8, in addition to the paths of the current in the previous position a new one is added in this position by connecting No. 2 armature when the resistance has been decreased. The second armature gets its current from contact 15 and goes through to the ground via finger 2 A'.

Position 9, diagram 9: This position is the same as the above, except the field resistance has been removed, leaving two shunt-motors in parallel. The path of the current is as follows: The current divides into four branches. The first leaving contact 10 goes to contact 9 via connections 10', 17', and 9', thence to A' and ground via finger 1 A' and finger 1 $A^2$ to contact 12, thence through connections 12' 11' and ground-finger G, which connects with contact 1. The second branch leaves contact 10, goes to contact 17 via connection 10', thence to $A^2$ and ground via finger 2 A'. The third branch leaves contact 10, goes to contact 16 via connections 10' 17', and thence to F' and ground via finger 1 F'. The fourth branch leaves contact 10, goes to contact 16 via connections 10' and 17', thence to contact 14 via finger 1 F', thence to the other finger 1 F', thence to contact 13, thence to contact 14 via connection 13', thence to $F^2$ via finger 2 F', thence to ground via finger 2 $F^2$ and contact 11, connection 11', contact 1, and ground-finger G.

In position 10, diagram 10, both armatures receive their current in exactly the same manner as in the previous position. The path for the fields is as follows: Current leaving the contact 10 goes through one division of resistance, via connection 19', resistance-contact I, resistance-finger 1, to entering side of first field. Here it divides, part going right on through the first field to G and the other part reaching field 2 via finger 1 F', contact 13, connection 13', contact 14, and finger 2 F'. It leaves the second field by finger 2 $F^2$ and gets to ground via contact 11, connection 11', and contact 1 and G finger.

Position 11, diagram 11: In this position the fields take current from the trolley through the entire resistance, as follows: The current leaves contact 10, goes through the resistance via connection 19', resistance-contact J, resistance-finger 6, thence to the entering side of F', from which place it follows paths exactly the same as in the previous position.

By reference to diagrams 1 to 11 it will be seen that in all the running positions, whether the armatures are in series or in parallel with each other, the field-circuit connection is always in parallel with the armatures, so that any discharge-currents from the field-magnets may find a path of low resistance through the armature.

In position 13, diagram 13, (the first braking position,) the fields are excited from the trolley as follows: The trolley-current leaves contact $B^7$, goes by connection B 7' to contact $B^2$, thence through field $F^2$ by finger 2 F' and coming out through 2 $F^2$ to contact $B^4$, thence through one division of resistance, via connection B 4', resistance-contact K, resistance-finger 6, through F' to the ground. Both armatures are short-circuited by connections B 5' and B 3' and contacts B' $B^3$ $B^5$ $B^6$. In this position the short-circuited armatures act as brakes for the vehicle, the effect being limited by the resistance in the field-circuit weakening the field.

Position 12, diagram 12: In this position the fields are more strongly excited, owing to most of the resistance being taken out, thus giving a stronger braking effect. The current coming to the resistance goes through resistance-finger 1 and thus through one division only. This difference in resistance is the only change from the combination above. The armatures remain connected in the same manner as previous position.

In disconnecting a single motor from others in series a great deal of trouble with and injury to the motors has been experienced when attempting to short-circuit the armature simultaneously with or even soon after short-circuiting the field, the trouble being caused by residual magnetism remaining in the fields after the current has ceased to flow in the coils. In one of the best-known standard railway-motors it has been found that a current away above the capacity of the armature-brushes to carry would be generated from the residual magnetism in the fields alone when the former was short-circuited. In practice it was necessary with cast-iron motors to dwell about four seconds after short-circuiting the field before short-circuiting the armature, so as to give the residual magnetism time to die down. It has also been found by experience that where the fields were gradually short-circuited the residual magnetism died down with a decrease of current through the coils and that the act of short-circuiting the armature may much more closely follow the short-circuiting of the fields. It will be noticed in all of the working combinations and changes the field is maintained in parallel with a low-resistance armature.

Fig. 2 represents in elevation the preferred form of controller. The wheel E is connected with the cylinder, a development of which is shown in Fig. 1. In the cylinder, Fig. 2, contact C corresponds with those shown in development numbered, respectively, from 1 to 17, while the terminals of the translating devices (represented by the disks in Fig. 1) are shown at D, Fig. 2. A side elevation of those fingers is shown in detail in Figs. 3 and 4. In Fig. 3 an eccentric is shown whereby the finger may be removed and held away from the cylinder, so that the cut-out switches ordinarily used in series-parallel controllers may be dispensed with and the construction simplified. The upper wheel G in Fig. 2 is used to vary the force of the separate motors, so that the vehicle may be steered somewhat in a manner used in driving a team of horses. One of the motors is urged forward, while the other is held back, thus turning the vehicle. The shaft of the wheel G passes through the hollow spindle of the controlling-drum and is connected mechanically to resistances placed in separate motor-circuits. In this case the resistance is shown in the field-circuit. By turning the wheel G to the right resistance is taken out of the field of motor No. 1. It will be understood that adding resistance to the field of either motor increases the speed of its armature, while decreasing the resistance decreases the armature speed.

In Fig. 5, L shows the batteries or source of energy, $A'$ and $A^2$ represent the armatures, and $F'$ and $F^2$ the corresponding fields of the motors. In the same Fig. 5 is shown a very convenient arrangement in the nature of an overload-alarm—i. e., a bell to ring when the motors or battery are being abused. The circuit of the bell J is shown connected in shunt with a block of carbon K, through which the main current passes, whether from or to the battery. The bell is adjusted in any well-known way to respond to such a current as may be previously determined.

To avoid the possibility of accidents by the car failing to stop at the will of the driver, whether connection is made with line or not, a supplementary switch is arranged, as shown at X in Fig. 6, to bring it to a stand under such circumstances. Suppose, for instance, the trolley leaves the wire or the main fuse blows when the motors are running at their highest speed. They are then instantly and automatically changed from shunt to series machines. Now in that position they will be short-circuited through their own fields, which are of high resistance. Consequently the energy wasted by the motors working as dynamos is small and its retarding effect proportionally efficient. Now if we move the controller backward gradually to the first parallel position the current increases and the speed of the car is decreased. If then we short-circuit the machines, as shown in Fig. 6, they again become shunt-wound dynamos and bring the car to a stand.

Having thus described the invention, the following is what is claimed as new therein and desired to be secured by Letters Patent:

1. A controller for a pair of motors comprising contacts and connections adapted and arranged, in one position of the controller, to connect the motors in parallel, in opposite relation to each other, each armature being in series with its field, and in a succeeding position cross-connecting them so that each armature is in shunt with the field of the other motor and in series with its own field.

2. A controller for a pair of motors comprising contacts and connections adapted and arranged, in one position of the controller, to connect the motors in parallel, in opposite relation to each other, each armature being in series with its field, and in a succeeding position cross-connecting them so that each armature is in shunt with the field of the other motor and in series with its own field, a variable resistance in said cross connection, and contacts in the controller for regulating such variable resistance.

3. The combination with the two oppositely-connected series motors connected in parallel to the circuit, of a cross connection between the motors, whereby a low-resistance path through the armatures is provided for discharges from the fields and the motors are protected from the induced current ordinarily caused by breaking of circuit.

4. A controller for regulating a pair of electric motors comprising contacts and connections adapted and arranged, in one position, to connect the armatures in series in one circuit and the field-magnets in series in a separate circuit, and in succeeding positions to gradually short-circuit the field of one motor, short-circuit and remove the corresponding armature, and then connect it and its field in parallel with the armature of the other motor.

5. A controller for regulating a pair of electric motors comprising contacts and connections adapted and arranged, in one position, to connect the armatures of the motors in series and the fields in series in separate circuits, and in succeeding positions to drop one of the motors from the circuit and to thereafter connect the armatures and fields of both motors in parallel.

6. A controller for regulating a pair of motors to change their armatures from series to parallel, comprising contacts and connections adapted and arranged in one position to connect one motor to but disconnect the other motor from the circuit, and in succeeding positions to partially excite the field of the disconnected motor, and to thereafter connect the armature of said latter motor in circuit in parallel with the field thereof, so that the current generated by the second armature is neutralized by that from the line.

7. A controller for regulating a pair of motors, comprising contacts and connections adapted and arranged, in one position, to connect the armatures of said motors in series and their field-magnets in series, and in succeeding positions, to increase the voltage of one of the motors by removing the other motor from the circuit, and to excite the fields of the second motor by a connection independent of its armature and of the first motor, and to then connect the armature of the second motor in parallel with that of the first motor.

8. A controller for regulating a pair of motors to change their armatures from series to parallel, comprising contacts and connections adapted and arranged, in one position, to disconnect one of the motors from the circuit, and in succeeding positions to connect the field, and subsequently the armature of said motor, in parallel with the other armature.

9. A controller for regulating a pair of electric motors, comprising contacts and connections adapted and arranged to change the armatures from series to parallel relation and maintaining the field-magnets in parallel with the armatures when operating the armatures in series or in parallel.

10. In an electric vehicle, the combination with the motor, storage battery and controller, of an electric bell connected in circuit with the battery and motors, and responsive to overload on the battery.

11. In an electric vehicle, the combination with the motor and controller, of an electric bell arranged with a shunt in the circuit of the motor and responsive to overload thereon.

SUSIE A. HENRY,
*Executrix of the estate of John C. Henry, deceased.*

Witnesses:
SAIDEE T. HENRY,
P. CARL HENRY.